Figure 1:
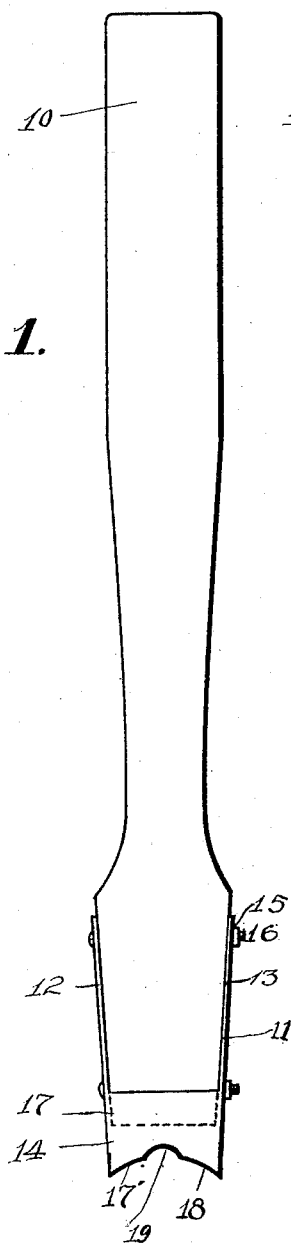

W. A. GAMBLE.
PLANTING STICK.
APPLICATION FILED AUG. 11, 1919.

1,327,030. Patented Jan. 6, 1920.

Witness

Inventor
W. A. Gamble.
By C. A. Snow & Co.
Attorneys

UNITED STATES PATENT OFFICE.

WILLIAM A. GAMBLE, OF MACON, GEORGIA.

PLANTING-STICK.

1,327,030.   Specification of Letters Patent.   Patented Jan. 6, 1920.

Application filed August 11, 1919. Serial No. 316,863.

*To all whom it may concern:*

Be it known that I, WILLIAM A. GAMBLE, a citizen of the United States, residing at Macon, in the county of Bibb and State of Georgia, have invented a new and useful Planting-Stick, of which the following is a specification.

This invention relates to new and useful improvements in agricultural implements, and more particularly to devices employed in transplanting plants of various kinds.

The primary object of the invention is to provide a device of this character which will force the root of the plant to be planted into the cultivated soil to a proper depth and position, to insure the growth of the plant.

A still further object of the invention is to provide an implement for the above mentioned purpose which will not break the root from the plant or injure the same so that its growth will be impaired.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the invention.

Referring now to the drawing:—

Figure 2:
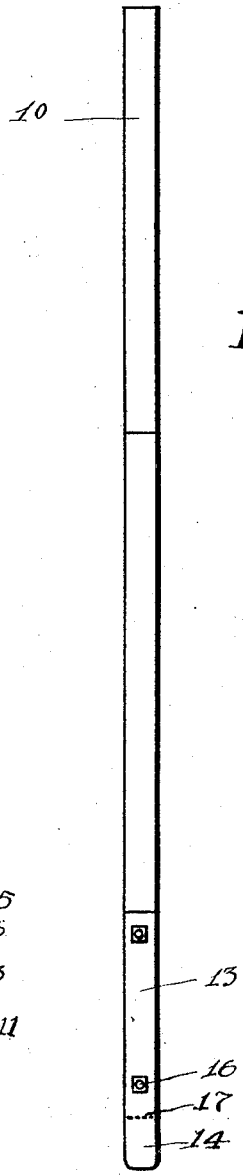

Figure 1 illustrates a front elevational view of a planting implement constructed in accordance with my invention, and Fig. 2 illustrates a side elevational view of the same.

Referring now to the drawing in detail, the reference character 10 designates the handle of the implement, which as shown is relatively short, but it is to be understood that the length of the handle may be varied, to suit the requirements of the user.

The lower side faces of the handle are tapered as at 11 to receive the corresponding tapered legs 12 and 13 of the planting head 14, said legs 12 and 13 being provided with apertures 15, for the reception of the screws, or other securing means 16, used for securing the planting head to the handle.

As shown, the legs 12 and 13 embrace the side edges of the handle 10 and are prevented from lateral displacement by means of the pocket 17, forming a part of the head 14, and adapted to receive the lower end of the handle 10.

The lower extremity of the planting head 14, includes walls 17′ and 18 inclined from the outer sides thereof to a point intermediate the width of the head, the point where the walls 17′ and 18 merge, being concaved to provide a curved plant engaging portion 19. These inclined walls 17′ and 18, have their edges rounded to prevent the implement from cutting or marring the plant when the planting head is brought into contact with the plant being planted.

In the operation of the device, the plants to be planted are deposited in suitable rows, or other formation in the approximate position in which they are to be planted, the roots thereof lying flat. The implement is then brought into operation by merely positioning the planting head on the root portion of the plant, whereupon the inclined surfaces 17′ and 18 cam the root into the plant engaging portion 19, when the handle is forced downwardly by the person using the planting implement.

It will therefore be seen that by using a transplanting implement as herein described, it is unnecessary for a person to use his hands for positioning the plant into the cultivated soil.

Having thus described my invention, what I claim is:—

1. In a transplanting implement, a handle having tapering side edges, a planting head secured to the handle and having tapered portions engaging the tapering side edges of the handle, said planting head having inclined walls, and a concaved plant engaging portion intersecting the inclined walls.

2. In a transplanting implement, a handle, a planting head having legs embracing a portion of the handle, camming surfaces forming one end of the planting head, and a concaved surface formed at a point where the camming surfaces merge.

3. In a transplanting implement, a handle, a planting head secured to one end of the handle, a concaved surface forming a part of the planting head, and means for camming a plant into the concaved surface.

In testimony that I claim the foregoing as my own, I have hereto affixed my signature in the presence of two witnesses.

WILLIAM A. GAMBLE.

Witnesses:
R. L. ANDERSON,
S. E. PATTON.